(12) United States Patent
Adair

(10) Patent No.: US 7,637,518 B2
(45) Date of Patent: Dec. 29, 2009

(54) UTILITY RAMP AND RUNNING BOARD SYSTEM

(76) Inventor: John T. Adair, 1009 Barry La., Cleburne, TX (US) 76031

( * ) Notice: Subject to any disclaimer, the term of this patent is extended or adjusted under 35 U.S.C. 154(b) by 483 days.

(21) Appl. No.: 11/379,531

(22) Filed: Apr. 20, 2006

(65) Prior Publication Data

US 2007/0246965 A1 Oct. 25, 2007

(51) Int. Cl.
*B60R 3/00* (2006.01)
*B62D 33/00* (2006.01)
*B62D 25/00* (2006.01)

(52) U.S. Cl. ............ 280/164.1; 280/163; 280/166; 280/169; 296/61; 296/62; 414/537

(58) Field of Classification Search ............ 280/163, 280/164.1, 166, 169; 296/61, 62; 414/537
See application file for complete search history.

(56) References Cited

U.S. PATENT DOCUMENTS

| 5,645,394 | A |   | 7/1997  | Hays |
| 5,676,515 | A | * | 10/1997 | Haustein ............ 414/537 |
| 6,185,775 | B1 |  | 2/2001  | McCarthy |
| 6,520,523 | B2 | * | 2/2003  | Beck ............... 280/164.1 |
| 6,592,135 | B2 | * | 7/2003  | Hendrix ............ 280/164.1 |

\* cited by examiner

*Primary Examiner*—Glenn Dayoan
*Assistant Examiner*—John R Olszewski
(74) *Attorney, Agent, or Firm*—Law Office J.D. Pemberton; John Pemberton

(57) ABSTRACT

A utility ramp having a latching feature to attach the utility ramp to steps mounted on the side of a vehicle. The latching feature provides a means for securing the utility ramp to the steps and allows the utility ramp to be used as a vehicle running board. Further, the utility ramp may include one or more jointed segments to allow the utility ramp to approximate a curved ramp.

18 Claims, 5 Drawing Sheets

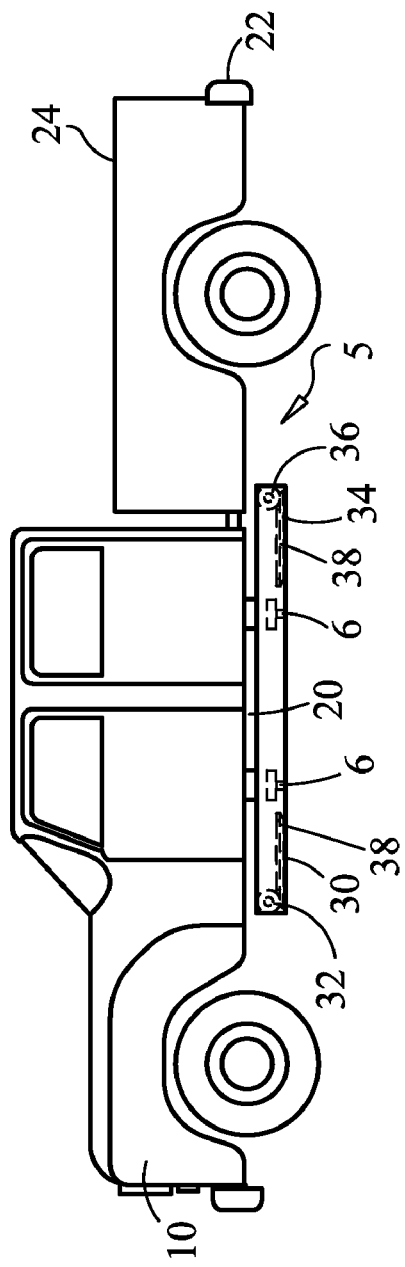
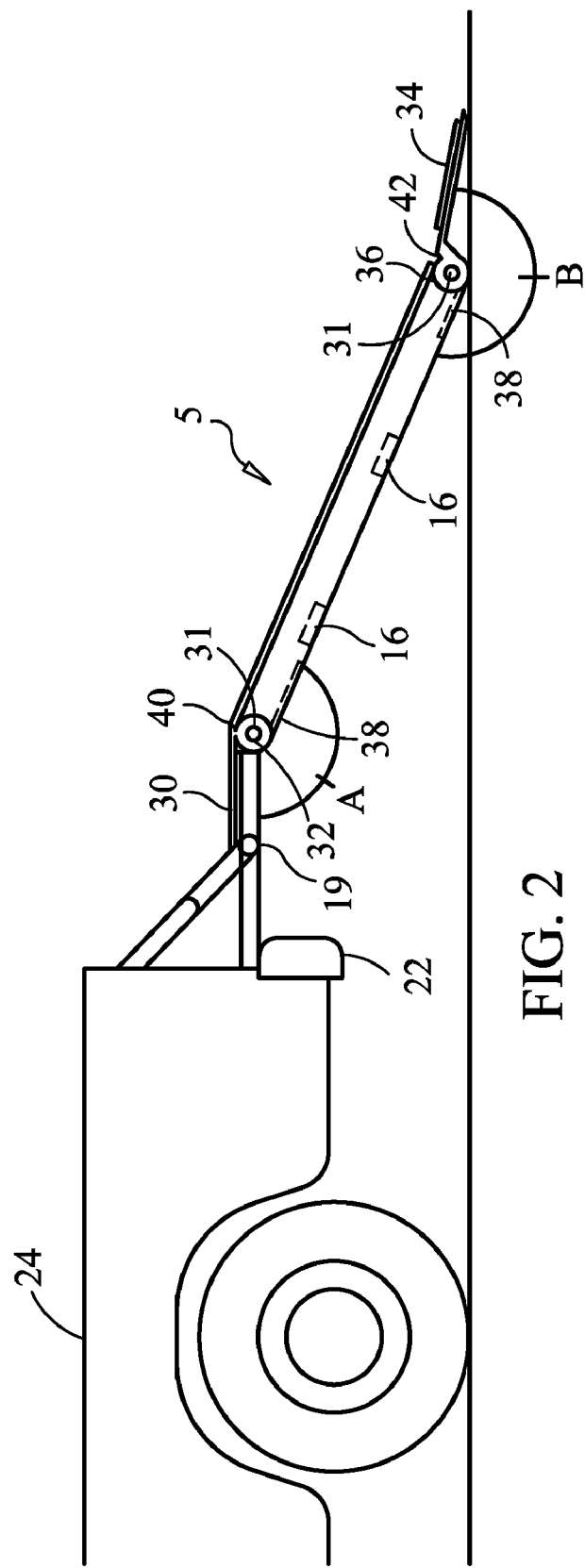

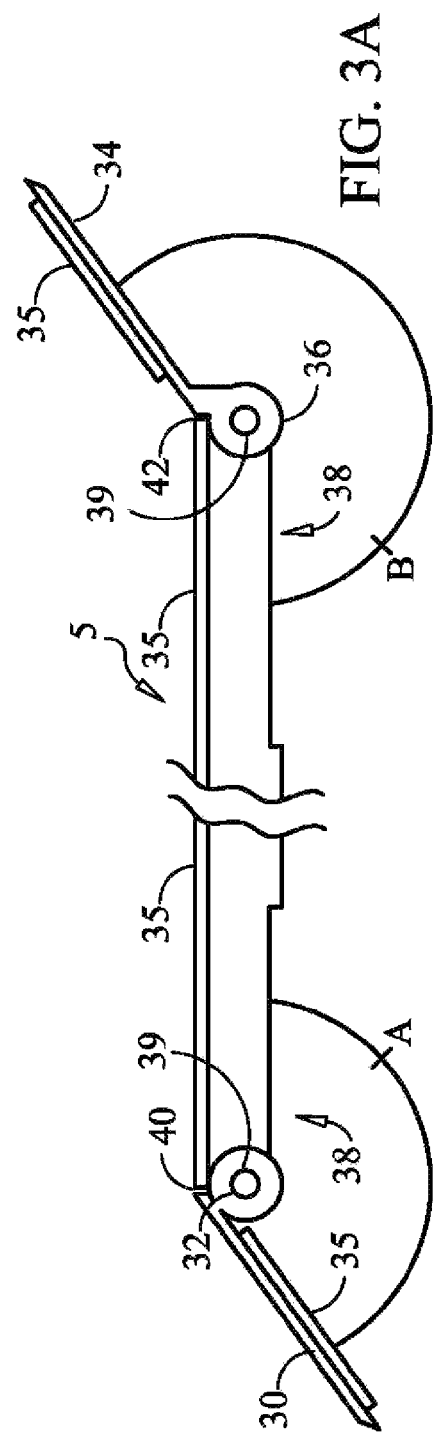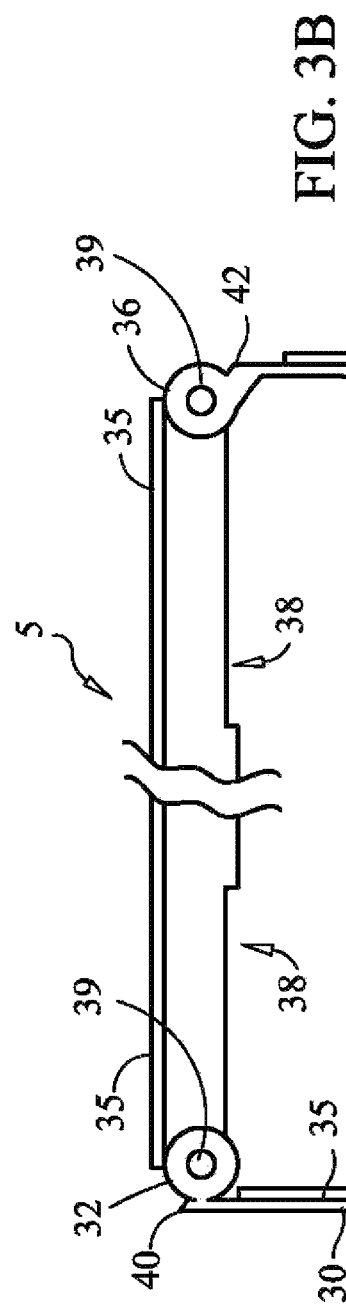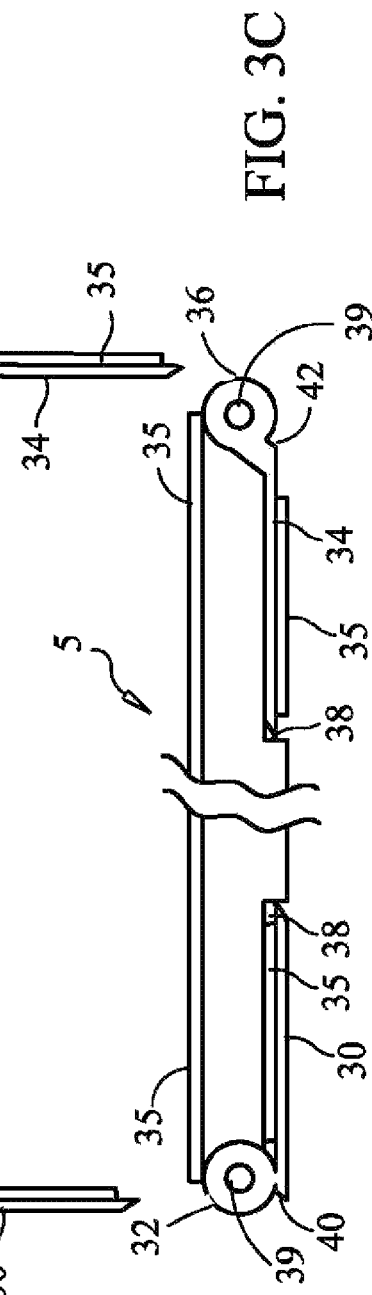

UTILITY RAMP AND RUNNING BOARD SYSTEM

BACKGROUND OF THE INVENTION

1. Technical Field

This invention relates to a vehicle utility ramp, and more particularly, to a vehicle utility ramp that can be stored and used as a vehicle running board when not in use as a utility ramp.

2. Description of Related Art

Utility vehicle, SUV, and pickup truck owners commonly transport machinery such as ATVs, motorcycles, snowmobiles, lawn mowers, and riding/garden tractors and material such as cable spools or large appliances such as refrigerators, couches, and stoves. Transportation of these items often involves loading the machinery or material onto the vehicle. In order to accommodate the loading, utility ramps have been developed to help raise the machinery or material into the vehicle. While the related art has attempted to address the issue of compact storage and portability of these utility ramps, it has failed to teach a storage method that is in itself useful, convenient and safe to the vehicle owner and any other persons or objects that may come in contact with the vehicle.

The related art systems have attempted to address these problems with varying success. For example, U.S. Pat. No. 5,645,394, issued to William Hays discloses an invention having an overlapping hinge feature. The hinge feature allows for compact storage through nesting of the ramp sections. However, Hays is deficient in that it does not disclose or suggest a safe, convenient and useful storage method and latching mechanism to store and convert the utility ramp into a vehicle running board.

U.S. Pat. No. 6,185,775, issued to Michael D. McCarthy discloses a portable ramp for providing a bridge between surfaces of different elevations. However, McCarthy is deficient in that it does not disclose or suggest a safe, convenient and useful support method and latching mechanism on a vehicle side for use of the utility ramp as a vehicle running board.

U.S. Pat. No. 6,520,523, issued to Bradley L. Beck discloses a removable running board for a vehicle that includes a quick-release mechanism for disengaging the running board from the vehicle. However, unlike the present invention, Beck is deficient in that, Beck does not disclose or suggest a safe, convenient and useful step that can securely support the utility ramp when the utility ramp is placed on the step.

U.S. Pat. No. 6,592,135, issued to Theron V. Hendrix discloses a removable running board for a vehicle that includes mounting the running board on front and rear mounting brackets secured to a lower central side portion of a vehicle, and a releasable lock means disclosed as a screw and nut assembly for disengaging the running board from the vehicle. However in Hendrix, the mounting brackets are horizontal projections away from the vehicle that are not useful for anything when the running board is removed. Therefore, Hendrix does not disclose or suggest a safe, convenient and useful step that can securely support the utility ramp when the utility ramp is placed on the step.

Related art systems suffer from the limitation that they do not have a useable step affixed to the side of a vehicle when the utility ramp is detached from the vehicle side.

What is needed is a utility ramp and running board system that possesses features providing safety, convenience, and utility both when the utility ramp is stored on the vehicle, and when the utility ramp is removed from the vehicle. It would be beneficial if the system had a step affixed to the vehicle that supports the utility ramp when the ramp is latched to the step.

SUMMARY OF THE INVENTION

The present invention provides a utility ramp and running board system that equips a vehicle with an esthetically pleasing and safe vehicle profile wherein the steps are affixed to the vehicle and do not present unusable and possibly unsafe horizontal projections away from the vehicle like the support brackets in the related art. Thus, in the present invention there is utility for users of the vehicle and users of the utility ramp both when the ramp is attached to the vehicle side and functioning as a running board or detached from the vehicle and functioning as a utility ramp.

In addition, a secure method of latching the utility ramp to the vehicle is provided. The present invention is an improvement over the related art in that the present invention provides a utility ramp and running board system that when either stored on the vehicle side, or removed from the vehicle side is esthetically pleasing, safe, functional, and useful. The present invention includes a step affixed to the vehicle wherein the step functions as a secured support for the utility ramp when the utility ramp functions as a running board and as step when the utility ramp functions as a utility ramp or is otherwise removed from the step.

The invention will be better understood from the following more detailed description taken in conjunction with the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a side view of an embodiment of the present invention being used as a running board according to the present invention.

FIG. 2 is a side view of the present invention being used as a utility ramp according to the present invention.

FIG. 3A is a side view of the release handle fully extended utility ramp position according to the present invention.

FIG. 3B is a side view of the release handle in transition from the open utility ramp position to the closed running board position according to the present invention.

FIG. 3C is a side view of the release handle in the closed running board position according to the present invention.

DETAILED DESCRIPTION

Figure 4:
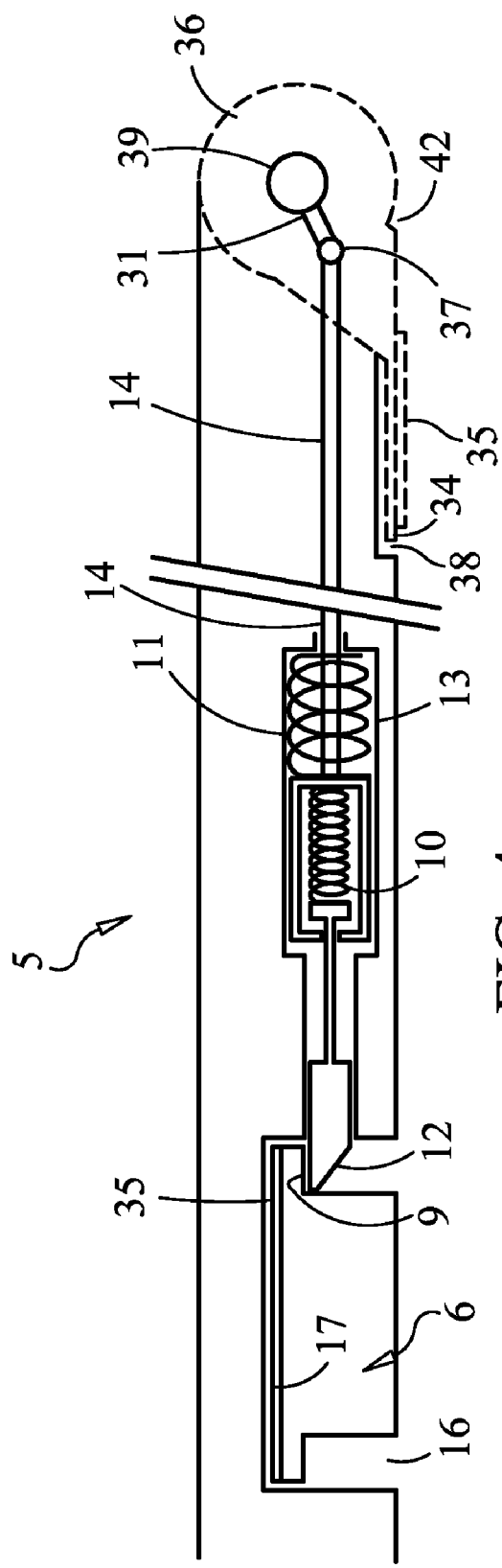
FIG. 4 is a cross sectional, partial side view of the preferred embodiment of a latching mechanism, showing the latching mechanism in the engaged position, latched to the support step for use in the present invention and the release handle in the closed running board position according to the present invention.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

Referring to FIG. 1, at least one step 6 is fixedly attached to a vehicle 10. Preferably, there are two or more of at least one step 6 that are attached to the frame or unibody of vehicle 10 along undercarriage 20. Step 6 supports utility ramp-board ("ramp-board") 5, wherein ramp-board 5 has an upper end and a lower end and provides the functionality of a running board when affixed to step 6. Vehicle 10 contains truck bed 24 and bumper 22. Ramp-board contains upper release handle 30, upper plate 32, lower release handle 34, lower plate 36, and handle groove 38. Upper release handle 30 is attached to upper plate 32 which is pivotally attached to the upper end of ramp-board 5 and lower release handle is attached to lower plate 36 which is pivotally attached to the lower end of ramp-board 5.

In use, utility ramp-board 5 is removed from step 6 and one end is placed upon the terminal end of open tailgate 19, on bumper 22 of vehicle 10, or at the end of bed 24 of vehicle 10 while the other terminal end is allowed to rest on the ground. In this configuration, ramp-board 5 provides a ramp wherein machinery or materials may be transported from the ground to the bed of the vehicle or vice versa.

FIG. 2 shows ramp-board 5 in the utility ramp configuration wherein upper release handle 30 of ramp-board 5 is affixed to the open tailgate 19. While not shown, upper release handle 30 may be affixed to bumper 22 of vehicle 10, the terminal end of bed 24, or any other suitable location to assist in the loading and unloading of machinery or material into or from vehicle 10. Upper release handle 30 is affixed to tailgate 19 such that angle A is between about 135° to about 170° from tailgate 19 to the bottom of ramp-board 5. The angle allows most machinery to transition from ramp-board 5 to truck bed 24 without bottoming out.

Lower release handle 34 at least partially rest on the ground such that angle B is between about 185° to about 225° from lower release handle 34 to ramp-board 5. The angle allows for machinery to relatively easily transition from the ground to lower release handle 34 to ramp-board 5.

As shown in FIG. 3A, upper plate 32 contains notch 40. Notch 40 engages the body of ramp-board 5 when upper release handle 30 is in the open utility ramp configuration and prevents angle A from extending past between about 135° to about 170°. Similarly, lower plate 36 contains lower notch 42. Lower notch 42 engages the body ramp-board 5 when lower release handle 34 is in the open utility ramp configuration and prevents angle B from extending past between about 185° to about 225°. FIG. 3B shows upper release handle 30 and lower release handle 34 transitioning from the open utility ramp position shown in FIG. 3A to the close running board position shown in FIG. 3C.

FIG. 3C shows at least a portion of upper release handle 30 and lower release handle 34 housed in handle groove 38. In an alternate embodiment handle groove 38 is not present and upper release handle 30 and lower release handle 34 rest on the surface of ramp-board 5. The length of upper release handle 30 and lower release handle 34 is at least about ½ inch, is preferably between about ½ to about 24 inches and most preferably between about 6 inches to about 8 inches. The length depends mostly on the ground clearance of vehicle 10 and the distance from the end of ramp-board 5 to at least one step 6. For example, if the ground clearance of vehicle 10 is about 12 inches, then the length of upper release handle 30 and lower release handle 34 would have to be less than about 12 inches to allow for the rotation of upper plate 32 and lower plate 36. Similarly, if when ramp-board 6 is being used as a running board and at least one step 6 is about 18 inches from either end of ramp-board 6, then the length of upper release handle 30 and lower release handle 34 would have to be less than about 18 inches to allow for ramp-board 6 to be placed over at least one step 6. Typically, when upper release handle 30 and lower release handle 34 are in the closed running board position shown in FIG. 3C, ramp-board 5 is secured to at least one step 6 as shown in FIG. 4.

FIG. 4 shows a cross sectional, partial side view of ramp-board 5 affixed to step 6. Ramp-board 5 contains aperture 16 that is adapted for attachment to step 6. Thereby, ramp-board 5 surrounds at least a portion of step 6 when affixed as a running board. Aperture 16 is preferably slightly larger than at least a portion of step 6 to allow easy attachment thereto. In one embodiment, step 6 may contain a lip or protrusion 9 that extends longitudinally from main body of step 6 for engagement with at least a portion of an attaching means such as latching mechanism 12 to aid in securing ramp-board 5 to step 6. Any practical means for securely keeping ramp-board 5 affixed to one or more step 6 may be used to retain ramp-board 5 in the running board position. However, one preferred attachment is with the use of latching mechanism 12 and plunger assembly 13.

Therein, plunger assembly 13 has a securing spring 11 in connection with rod 14 such that a spring compression force applied to rod 14 will securely latch ramp-board 5 to step 6 by forcing engagement of latching mechanism 12 to lip 9 of step 6 when utility ramp-board 5 it is on step 6. Securing spring 11 pushes latching mechanism 12 beneath lip 9 of step 6 with sufficient force to prevent ramp-board 5 from disengaging with step 6 during use of vehicle 10.

Figure 5:
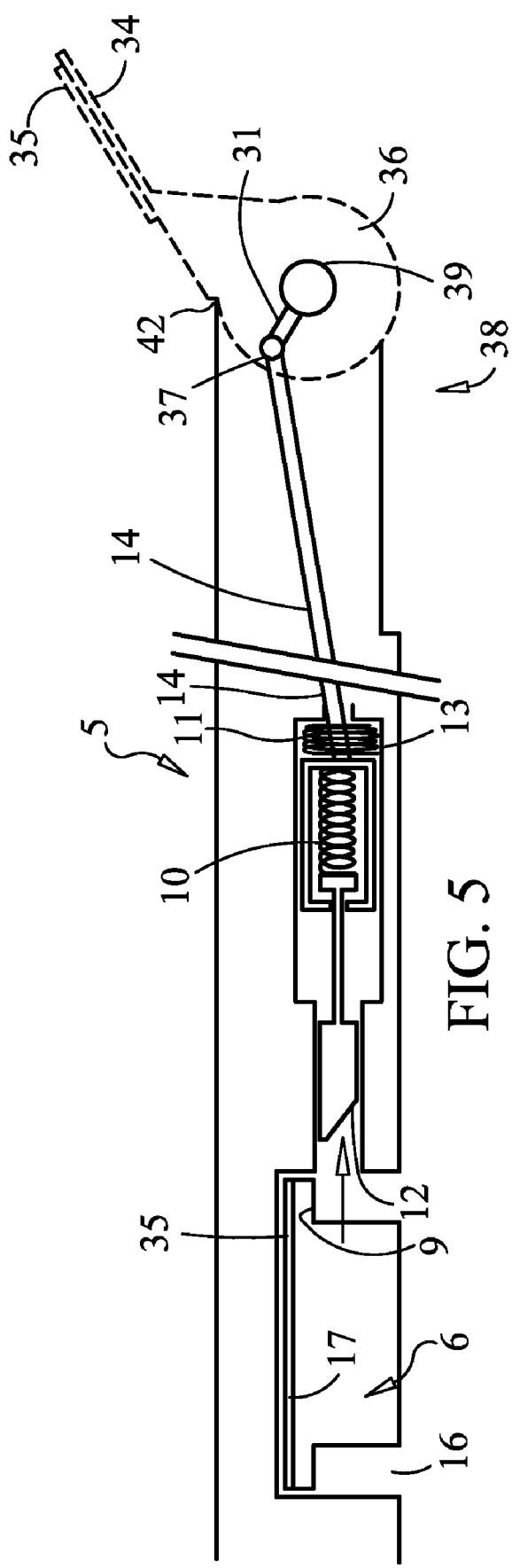
FIG. 5 is a cross sectional, partial side view of the detail of the preferred embodiment of a latching mechanism, showing the latching mechanism in the disengaged position, and the release handle in the open utility ramp position for use in the present invention according to the present invention.

As shown in FIG. 4, lower plate 36 is affixed to an end of ramp-board 5 such that latching mechanism 12 is in communication with lower plate 36 via rod 14. Although not shown, a latching mechanism may be applied for affixing ramp-board 5 to a step 6 at either terminal end of ramp-board 5. When latching mechanism 12 is set to an engaged position, lower release handle 34, which is attached to lower plate 36, is in a closed running board positioned. For an open, utility ramp position, lower release handle 34 is rotated about pivot point 39 within lower plate 36 such that lower release handle 34 extends outward and away from the body of ramp-board 5 similar to the configuration shown in FIG. 3A. When lower release handle 34 is rotated, pivot point 39 is rotated along with ball joint 37 located at the end of rod 14. As ball joint 37 is askew slightly of pivot point 39, rod 14 is able to pass through pivot point 39 during the rotation of lower plate 36. Securing spring 11, which was being compressed as ball joint 37 rotated past pivot point 39, begins to decompress and the spring tension in securing spring 11 prevents ball joint 37 from rotating past pivot point 39 and secures ramp-board 5 in the open utility-ramp position shown in FIG. 5. While the above process has been explained with respect to lower release handle 34 and lower plate 36, the same process is used with upper release handle 30 and upper plate 32.

Figure 8:
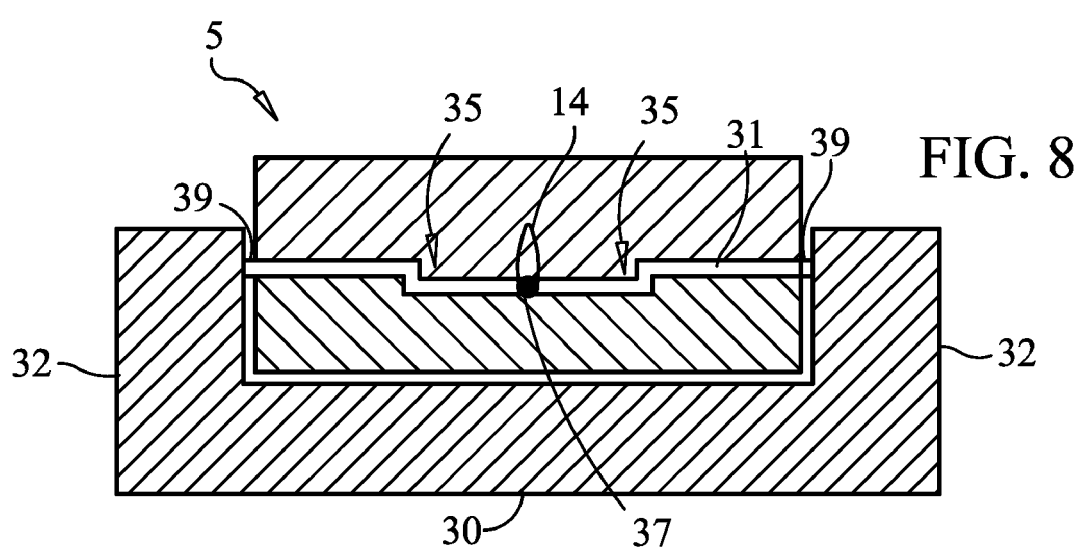
FIG. 8 is a cross sectional back view of the present invention.

FIG. 8 is a cut-away side view showing upper release handle 30, upper plate 32, pivot point 39, connecting rod 31, offset 35, ball joint 37, and rod 14. Similar to the process described above, when upper release handle 30 is extended from ramp-board 5, upper plate 32 is rotated about pivot point 39. As pivot point 39 is rotated, connecting rod 31 rotates ball joint 37. Ball joint 37 pulls rod 14 which compresses securing spring 11. As offset 35 passes pivot point 39, ball joint 37 and rod 14 pass pivot point 39 and ball joint 37 ceases to pull rod 14 and securing spring 11 begins to expand and release the spring tension acquired when securing spring 11 was being compressed and pulls ball joint 37 and rod 14 passed pivot point 39. The remaining tension in securing spring 11 prevents ball joint 37 from unexpectedly rotating back around pivot point 39.

To disengage utility ramp-board 5 from step 6, upper plate 32 is rotated via upper release handle 30 such that connecting rod 14 compresses securing spring 11 thereby releasing latching mechanism 12 from contact with step 6. See FIG. 5. This draws latching mechanism 12 away from step 6 a sufficient distance so that latching mechanism 12 can clear step 6. Once latching mechanism has been disengaged from step 6, utility ramp-board 5 may be lifted off of step 6 and used as a utility ramp. In an alternate embodiment, latching mechanism 6 may be attached to the underside of utility ramp-board 5. While the invention has been shown with one example of a latching mechanism, any known retaining devices, such as locks and latches, may be employed to retain ramp-board 5 to vehicle 10.

To securely attach ramp-board 5 to step 6, ramp-board 5 is set on step 6 such that aperture 16 is directly above step 6. Then, downward force is applied to utility ramp-board 5 sufficient to cause latch spring 10 to retract and allow latching mechanism 12 to slide over protrusion 9 on step 6. Once latching mechanism 12 has cleared protrusion 9, latch spring 10 exerts sufficient force to move latching mechanism 12 into contact with step 6. Protrusion 9 prevents latching mechanism 12 from relatively significant upward movement and prevents utility ramp-board 5 from disengaging with step 6. In addition, the spring tension in securing spring 11 prevents ball joint 37 from rotating past pivot point and helps secure ramp-board 5 in the closed running board position.

Top 17 of step 6 may be covered by non slip material 35, preferably rubber or diamond plate, to aid in securing utility ramp-board 5 to step 6 and to increase the safety functionality of step 6 when not in use as a support for utility ramp-board 5. In addition, ramp-board 5, upper release handle 30, and/or lower release handle 34 may be covered by non slip material 35. Preferably, non-slip material 35 is a rubber material or diamond plate to increase traction. Also, ramp-board 5, upper release handle 30, and/or lower release handle 34 may be comprised of metal mesh or grating material.

Figure 6:
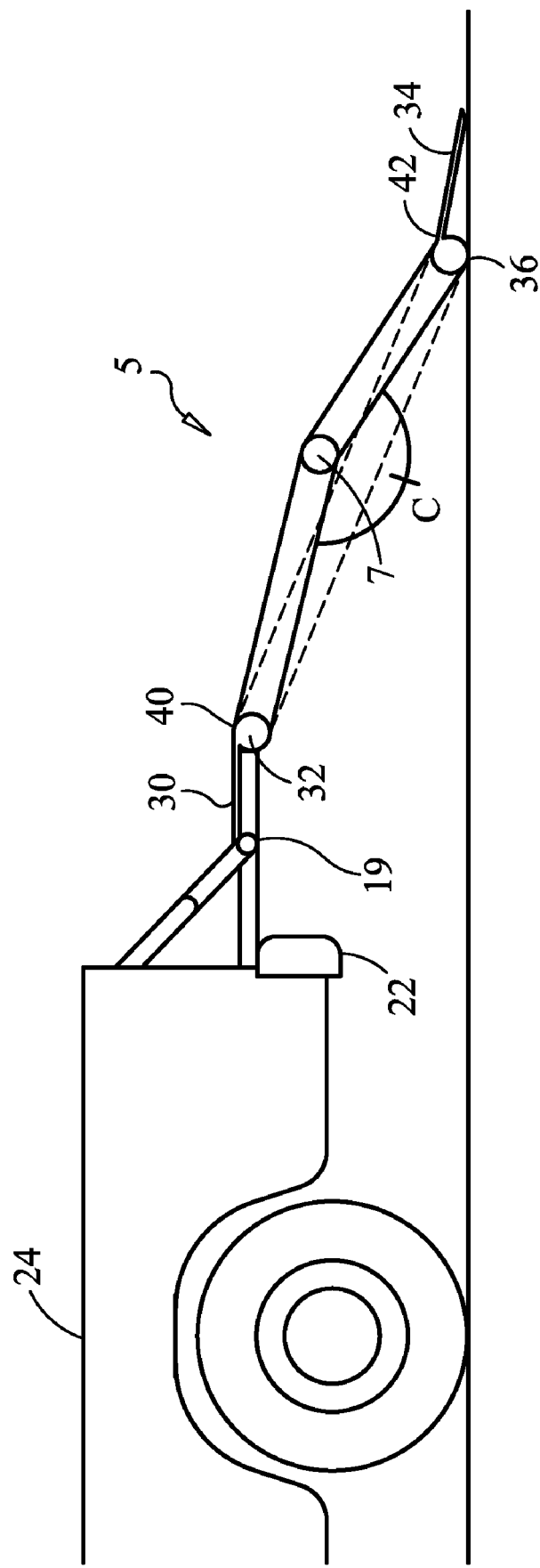
FIG. 6 is a side view of the present invention being used as a utility ramp according to an alternate embodiment of the present invention.

In an alternate embodiment, shown in FIG. 6, ramp-board contains hinge 7. Hinge 7 provides for adjustment of the utility ramp-board 5 to assist with the loading and unloading of equipment to and from vehicle 10 and can be used to create angle C which is less than about 45 degrees and preferably between about 5 degrees and about 15 degrees.

Hinge 7 is particularly useful with vehicles such as light pickup trucks and small sport utility vehicles wherein the length of ramp-board 5 would be relatively short compared to the height of the vehicle's undercarriage. A version of ramp-board 5 without hinged 7 would create a steep incline when positioned as a ramp, which would deter the loading and unloading of equipment and materials. By providing hinge 7, the transition from ramp-board 5 to vehicle 10 can be more gradual. Also, hinge 7 may be articulated so that ramp-board 5 may approximate a curved ramp when desired by the user.

Figure 7A:
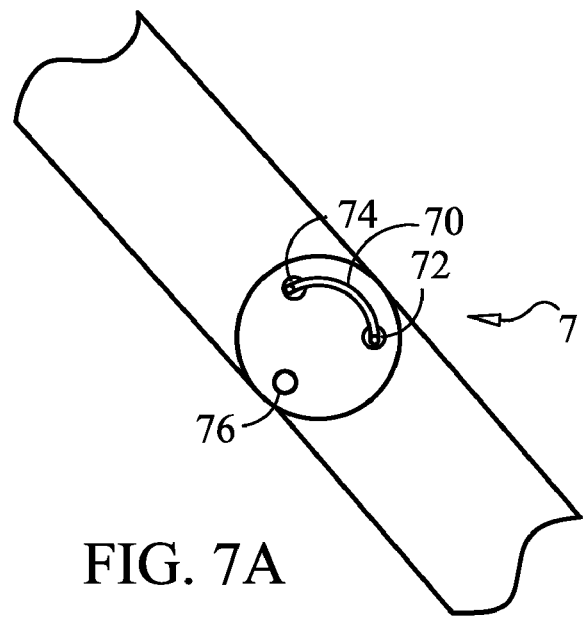
FIG. 7A is a side view of the ramp locking mechanism of the present invention wherein the ramp locking mechanism is in the fully extended position.
Figure 7B:
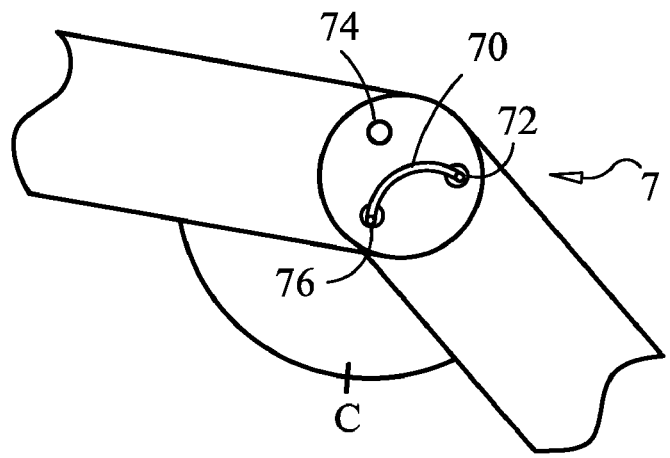
FIG. 7B is a side view of the ramp locking mechanism of the present invention wherein the ramp locking mechanism is in the angled position.

In use, as shown in FIGS. 7A and 7B, hinge 7 contains U-shaped pin 70 having a secured end and a free end. The secured end of U-shaped pin 70 is secured by a spring loaded mount in securing hole 72 and the free end is free to pivot around securing hole 72. When ramp-board 5 is in a straight line configuration such as the one shown in FIG. 2, the free end of U-shaped pin 70 is in straight configuration hole 74, as shown in FIG. 7A. When ramp-board 5 is in an angled configuration such as the one shown in FIG. 6, the free end of U-shaped pin 70 is in angled configuration hole 76, as shown in FIG. 7B. Other means may be used to create the angled configuration shown in FIG. 6 and such other means should obvious to those skilled as well as other configurations such as rounded or to locate pivot point 7 at different places on ramp-board 5. In addition, more than one pivot point 7 may be used.

FIG. 8 shows an end-cut away view of ramp-board 5 showing upper release handle 30, upper plate 32, pivot point 39, connecting rod 31, ball joint 37, and connecting rod 14.

Although the invention has been described with reference to one or more preferred embodiments, this description is not to be construed in a limiting sense. Modification of the disclosed embodiments, as well as alternative embodiments of this invention, will be apparent to persons of ordinary skill in the art, and the invention shall be viewed as limited only by reference to the following claims.

What is claimed is:

1. A combination utility ramp and running board comprising:
    means for securing a utility ramp to at least one surface, wherein an object may be transported on the utility ramp between separated surfaces; and
    latching means for attaching the utility ramp to at least one step affixed to a vehicle side underneath the frame or unibody, wherein the utility ramp is supported by the step for use as a running board and the latching means includes a plunger assembly with a connecting rod attached to an elongate member coupled to a release handle, the release handle being rotatably connected to the elongate member, wherein the latching means is engaged by rotating the release handle into a folded position, and the latching means is disengaged by rotating the release handle into an unfolded position.

2. The combination as claimed in claim 1 wherein the means for securing the utility ramp further comprises means for achieving a non slipping, stable attachment of the utility ramp to each of the separated surfaces.

3. The combination as claimed in claim 1 wherein the means for securing the utility ramp further comprises means for adjusting an angle of a section of the utility ramp so that the utility ramp can be articulated to approximate a curved ramp.

4. The combination as claimed in claim 1 wherein the latching means for attaching the utility ramp to the at least one step affixed to the vehicle further comprises means for securely latching the utility ramp to the step.

5. The combination as claimed in claim 4, wherein the means for securely latching the utility ramp further comprises a means for quickly releasing the latching means, to facilitate removal of the utility ramp from the vehicle.

6. The combination as claimed in claim 1, wherein the at least one step comprises a first step and a second step and the means for attaching the utility ramp on the vehicle side further comprises means for attaching the utility ramp to the first step and the second step on a first longitudinal side of the vehicle and means for attaching a second utility ramp to a third step and a fourth step on a second longitudinal side of the vehicle, thus providing dual side running boards along exterior portions of the longitudinal sides of the vehicle.

7. A utility ramp and running board system comprising:
an elongate member wherein the elongate member can be used as a utility ramp when detached from a side of a vehicle;
the elongate member wherein the elongate member can be used as a running board when attached to the side of the vehicle and the elongated member contains a latching mechanism;
at least one step affixed to the vehicle side, wherein the step contains a flange over which the latching mechanism latches the elongate member to the vehicle side and the step supports the elongate member when the elongate member is attached to the step.

8. The utility ramp and running board system as claimed in claim 7, wherein the elongate member further comprises a hinged section for adjusting an angle of a section of the utility ramp so that the utility ramp can be articulated to approximate a curved ramp.

9. The utility ramp and running board system as claimed in claim 7, wherein the step further comprises a non slip top to facilitate adhesion of a person's foot to the step when the elongate member is detached from the step, and to facilitate adhesion of the elongate member to the step when the elongate member is attached to the step.

10. The utility ramp and running board system as claimed in claim 9, wherein the non-slip top of the step comprises a rubberized layer.

11. The utility ramp and running board system as claimed in claim 7, further comprising a plunger assembly with a connecting rod of the latching mechanism attached to the elongate member coupled to a release handle, the release handle being rotatably connected to the elongate member, wherein the latching mechanism is engaged by rotating the release handle into a folded position, and the latching mechanism is disengaged by rotating the release handle into an unfolded position.

12. The utility ramp and running board system as claimed in claim 11, wherein the release handle is capable of supporting the elongate member against an edge of the vehicle or along a ground surface.

13. The utility ramp and running board system as claimed in claim 7, wherein the latching mechanism comprises a coil spring connected to a plunger assembly, further wherein a spring compression force is applied to the plunger assembly to securely latch the utility ramp to the at least one step, when a second force applied to the top of the elongate member engages the latching mechanism.

14. The utility ramp and running board system as claimed in claim 13, wherein the plunger assembly is connected to a first coil spring which is housed between the plunger assembly and the body of the elongate member to provide a first counterforce against a release handle to keep the release handle in a folded position when the latching mechanism is engaged.

15. The utility ramp and running board system as claimed in claim 14, wherein a position of the release handle places the connection to the plunger assembly at a first angle that is sufficiently out of a plane parallel to the elongate member to cause the first counterforce to be applied by the second coil spring.

16. The utility ramp and running board system as claimed in claim 14 wherein the plunger assembly is connected to a second coil spring which is housed between the plunger assembly and the body of the elongate member to provide a second counterforce against the release handle to keep the release handle in an unfolded position when the latching mechanism is disengaged.

17. The utility ramp and running board system as claimed in claim 16 wherein a position of the release handle places a connection to the plunger assembly at a second angle that is sufficiently out of a parallel plane to the elongate member to cause the second counterforce to be applied by the second coil spring.

18. The utility ramp and running board system as claimed in claim 7, wherein the at least one step further comprises a non-slip surface.

* * * * *